United States Patent [19]
Schwartz

[11] 3,888,115
[45] June 10, 1975

[54] STRAIN SENSOR
[75] Inventor: Robert J. Schwartz, Houston, Tex.
[73] Assignee: Texas Instruments Incorporated, Dallas, Tex.
[22] Filed: Mar. 30, 1973
[21] Appl. No.: 346,516

[52] U.S. Cl. ............ 73/88.5 R; 73/88.5 SD; 310/82; 310/83; 310/9.8
[51] Int. Cl. ...................... G01b 7/16; G01l 1/10
[58] Field of Search ........ 73/88 R, 88.5 SD, 88.5 R, 73/67.6, 71.4; 177/210; 310/9.5, 9.8, 83, 82; 324/80; 333/30, 72

[56] References Cited
UNITED STATES PATENTS

| | | |
|---|---|---|
| 2,968,950 | 1/1961 | Dunbar et al. ............... 73/517 AV |
| 2,984,111 | 5/1961 | Kritz ............................ 73/517 AV |
| 3,002,391 | 10/1961 | Holmes ......................... 73/517 AV |
| 3,548,306 | 12/1970 | Whitehouse ....................... 324/80 |
| 3,575,050 | 4/1971 | Lynnworth ........................ 73/194 A |
| 3,766,496 | 10/1973 | Whitehouse ...................... 333/30 R |

Primary Examiner—Richard C. Queisser
Assistant Examiner—Anthony V. Ciarlante
Attorney, Agent, or Firm—Harold Levine; Rene E. Grossman; Thomas G. Devine

[57] ABSTRACT

A strain sensor has a surface wave device deposited on a substrate. The surface wave device is connected into an oscillator circuit oscillating within a predetermined frequency range. A mechanical strain is induced in the substrate to alter the frequency of oscillation of the surface wave oscillator.

4 Claims, 4 Drawing Figures

Δf MAX ~ 0.03%
e.g. 30 KHZ/100 MHZ f OSC

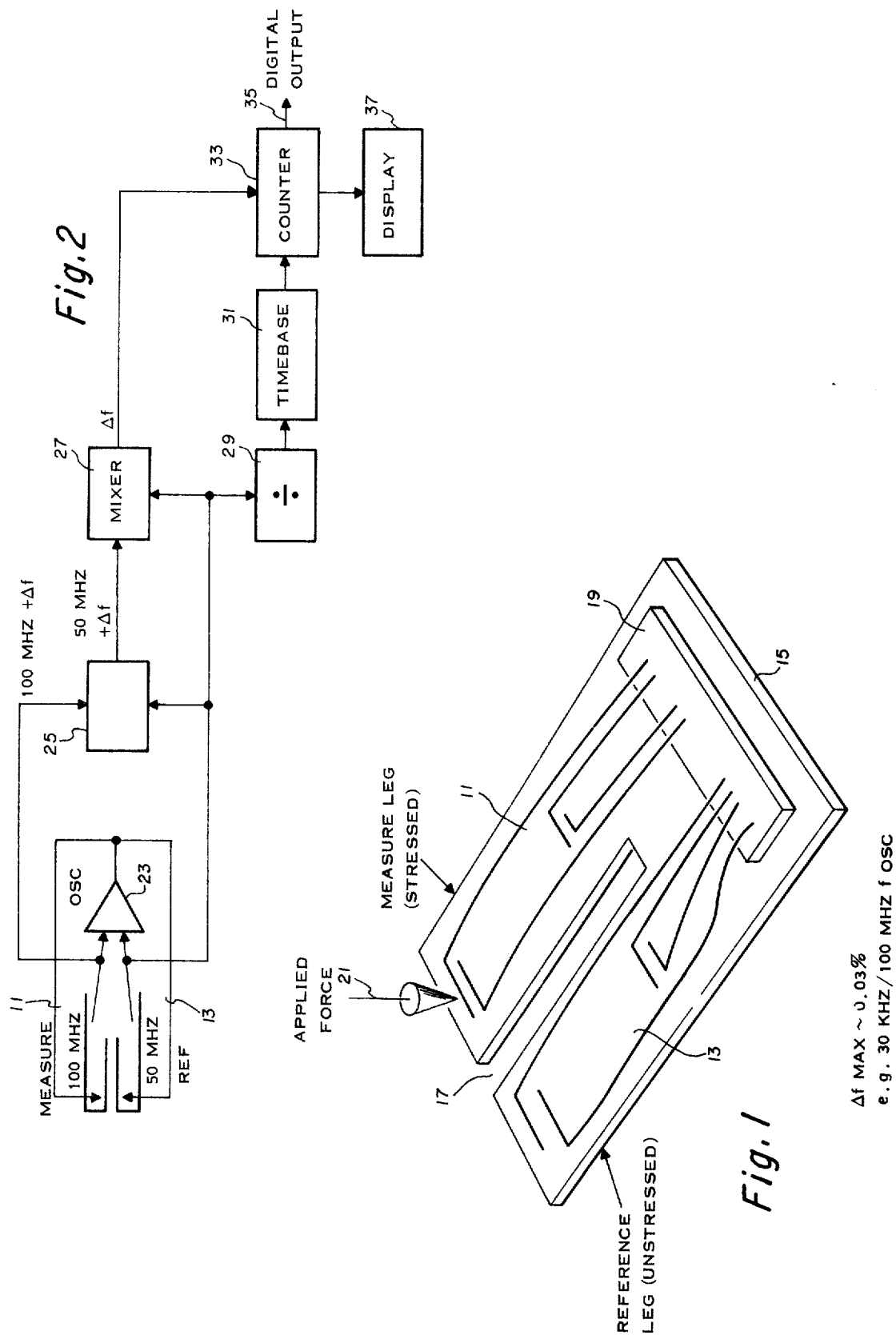

STRAIN SENSOR

This invention is directed to a strain sensor and more particularly to a surface wave device strain sensor.

Conventional strain gauges are commonly used for strain sensing. These strain gauges normally employ four strain sensitive resistive elements mounted and connected in a bridge configuration to minimize temperature effects. When the resistive elements and strain gauges are comprised of metal films the output of the bridge is a very low level analog signal. Semiconductor strain elements are often used to achieve higher sensitivity and corresponding higher output signals, however, semiconductor strain elements are only used at the expense of stability.

It is therefore an object of this invention to provide a new and improved strain sensor having a high level signal in the frequency or time domain. It is another object of this invention to provide a new and improved strain sensor having a high level output signal that can be applied to digital counting circuits or to a computer as an input. Another object of this invention is to provide a new and improved sensor that can be fabricated using conventional semiconductor device processes. Yet another object of this invention is to provide a new and improved strain sensor having a built in reference providing independence from temperature and positional effects. Another object of this invention is to provide a new and improved strain sensor providing high sensitivity, resolution, and stability.

IN THE DRAWINGS

FIG. 1 shows the fabricated strain sensor;

FIG. 2 is an electronic diagram of the strain sensor;

Figure 3:
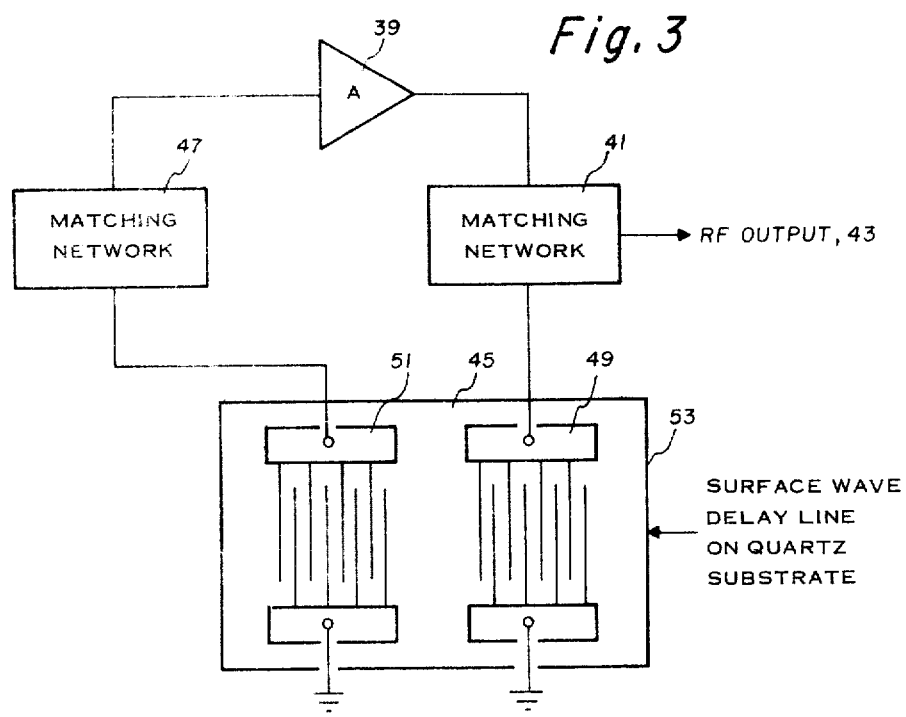
FIG. 3 illustrates a surface wave oscillator.

Referring now to FIG. 1, a first surface wave oscillator 11 and a second surface wave oscillator 13 are fabricated side by side on a crystalline quartz substrate 15 as is conventionally done with batch slice processing. The surface wave oscillators 11 and 13 are oriented with a crystal axis chosen for minimum (or desired) temperature sensitivity. The crystalline quartz substrate 15 is provided with a sawcut 17 through the substrate between the two oscillators 11 and 13. This sawcut 17 provides mechanical isolation between the two oscillators providing two legs of the device with one oscillator on each leg. The sawcut 17 is not quite completed to provide a configuration analogous to a horse shoe. On the uncut end of the substrate 15 a smaller substrate 19 may be mounted containing the active elements to permit the surface wave devices 11 and 13 to function as oscillators. A mixer may also be provided in the substrate 19 to produce an output which is the function of the difference in frequency between the two surface wave oscillators 11 and 13. The mechanical coupling 21 is applied to the free tip of one of the oscillator legs 11 to provide for stressing of that leg 11. The other oscillator leg 13 is left free of mechanical coupling to serve as a reference by which changes due to temperature or position can be developed and used to cancel similar effects that are induced in the stressed leg 11.

Referring now to FIG. 2 for a description of the strain sensor.

The reference-surface-wave-oscillator 13 illustratively is configured to operate at 50 MHz while the measure-oscillator 11 operates at 100 MHz. In this particular embodiment the two oscillators operate at different frequencies to ensure that there is no cross-talk between the oscillators. With adequate isolation against cross-talk, it is possible to have them operate at the same frequency. Amplifier 23 is provided to complete the oscillators. The output from both of the oscillators 11 and 13 is applied to a mixer 25 providing an output from mixer 25 which consists of the 50 MHz signal plus a delta frequency (the change in frequency) resulting from the applied force to oscillator 11. The output from mixer 25 and the output from oscillator 13 are both applied to mixer 27 providing an output which is the delta frequency resulting from the applied force to oscillator 11. The output from the reference oscillator 13 is also applied to a divider 29 and a time base circuit 31 providing a time base. The output of the time base 31 is applied to a counter 33 along with the delta frequency from mixer 27. This provides an output from the counter 33 which is an indication in digital form of the count indicating the delta frequency. The division ratio of the timebase may be selected so as to produce an output scaled in convenient engineering units. This is used either as a digital output on output terminal 35 which may be applied to a computer as a direct input, or to a display 37. The mixers, oscillators, counter and time base circuits are all standard circuits.

The applied force (FIG. 1) applied to the measurement oscillator leg 11, may take several forms depending upon the particular use to which the strain sensor is put. For instance, it may be the output from a Bourdon tube coil, diaphragm, or bellows if it is desired to measure pressure. The strain sensor may also be used as a microphone by coupling the sensor to a diaphragm. By attaching an appropriate mass to the strain sensor the assembly can also be used as an accelerometer or a geophone.

A block diagram of a suitable surface wave oscillator is shown in FIG. 3 with an amplifier 39 operatively coupled to an output impedance matching network 41 having an output power terminal 43 to an external load (not shown) and an output to a surface wave delay line device 45 in the regenerative or feedback loop. The output of the surface wave delay line device 45 is coupled through an input impedance matching network 47 to the input of the amplifier 39. For oscillation to occur, two basic requirements must be met: firstly, the overall loop gain must be unity, and secondly, the phase shift around the loop must be zero, or a multiple of $2\pi$.

To meet the first requirement, the amplifier is designed to have sufficient gain to overcome the losses in the feedback network, and to provide useful output power to the load. To meet the second requirement, the surface wave delay line device is designed to yield total zero degree loop phase at the operating frequency when all other phase shift elements in the feedback loop are considered. The unique ability to independently specify the amplitude response and phase slope (phase versus frequency curve) in the surface wave delay line device allows the best compromise to be made between high stability and frequency deviation capability in the oscillator.

In order to apply modulation to the surface wave oscillator, it is necessary to vary the phase of some element in the oscillator loop. From the phase versus frequency curve (phase slope) of the surface wave device, it is possible to determine how much the oscillator frequency has to shift to regain the total zero degrees loop phase. For a parallel tuned circuit which might be used as a matching network for the surface wave device, the tuning network can be tuned off resonance to cause a fairly linear phase shift of up to plus or minus 30°. The surface wave device is then designed to change frequency the desired amount of plus or minus 30° phase shift on its phase slope.

As to the phase slope, in the general case of a delay line with time delay $T_d$, the phase slope is given by the following equation:

$$\frac{\Delta \theta}{\Delta F} = (-360°) T_d. \tag{1}$$

$\Delta \theta$ is the phase shift and $\Delta F$ is the frequency change. For the specific case of the linear phase surface wave delay line, it is convenient to give the time delay in terms of the number of RF cycles, $N'$, at the operating frequency $F_o$, such that $T_d = N'/F_o$. Substituting this express expression in equation (1)

$$\frac{\Delta \theta}{\Delta F} = (-360°) \frac{N'}{F_o}. \tag{2}$$

From this it can be seen that for a surface wave delay line, the Q can be defined by $Q = 3.6 N'$ which means that the equivalent Q for a surface wave control oscillator is directly proportional to the number of RF cycles of time delay in the line at the operating frequency. The equivalent Q of the surface wave delay line can be increased by increasing the time delay of the delay line. As shown in FIG. 3, the surface wave delay line consists of a pair of interdigital electrode transducer patterns 49 and 51 deposited on a substrate 53. The velocity of the acoustic surface wave on the substrate material is about $10^5$ slower than the velocity of an electromagnetic wave in free space. This velocity is used to determine acoustic wave lengths in delay lines for any particular substrate material.

The amplitude and phase response of the surface wave delay line device can be specified independently as was previously mentioned. The amplitude response is a function of the number of RF cycles or electrode pairs in the individual transducer patterns. For a surface wave transducer having N number electrode pairs or cycles of RF at some frequency $F_o$, the transducer represents a rectangular impulse response envelope of RF energy at $F_o$ whose length in the time domain is $T_d = N/F_o$. This rectangular impulse response will have a sin $X/X$ response in the frequency domain centered at $F_o$. The overall response of the delay line will be the product of the individual responses of the input and output transducers. If both transducers have the same number of RF cycles, the overall frequency response will be (sin $X/X)^2$. The 6 db bandwidth of this type of response is very nearly equal to $F_o/N$. The phase response of the delay will be linear and its slope will be a function of the time delay between the centers of the input and output transducers 49 and 51, respectively. It is convenient to express the time delay in terms of the number of RF cycles at the operating frequency separating the transducers.

Figure 4:
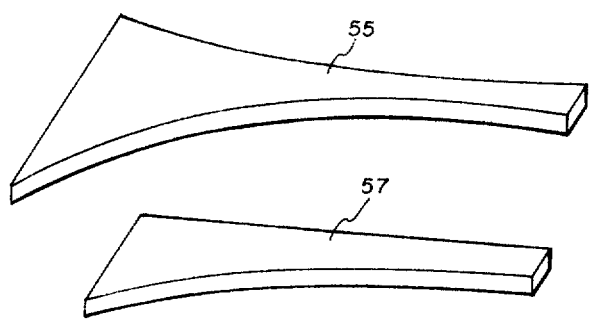
FIG. 4 illustrates the construction of the legs of the strain sensor.

FIG. 4 shows two different configurations of the legs of the substrate 15 on which the surface wave devices are deposited. The first leg 55 is an ideal configuration and the second leg 57 is a trapezoid. The second leg 57 is easily fabricated after the surface wave devices are deposited on the substrate. These configurations are chosen to obtain uniform strain along the surface of each leg. The strain is constant as the force applied to the leg is increased. This configuration provides a constant strain which a rectangular leg does not provide.

What is claimed is:

1. A strain sensor comprising:
   a. a first surface wave device deposited on a first substrate, first means connecting said first surface wave device into a first oscillator circuit oscillating within a first predetermined frequency range,
   b. a second surface wave device deposited on a second substrate, second means connecting said second surface wave device into a second oscillator circuit oscillating within a second predetermined frequency range, said first substrate having no deliberate mechanical force applied thereto,
   c. means for inducing a deliberate mechanical strain in said second substrate to alter the frequency of oscillation of said second oscillator circuit, and
   d. means for comparing the frequency of oscillation of said first and second oscillators to indicate the change in frequency of said second oscillator resulting from the application of deliberate strain in its substrate.

2. The strain sensor claimed in claim 1 wherein said comparing means includes a mixer to indicate the difference in frequency between said two oscillators, means for establishing a time base, and counter means responsive to said established time base and said difference frequency to indicate in digital form the induced strain.

3. A strain sensor comprising:
   a. a substrate having first and second legs mechanically isolated from each other,
   b. a first surface wave device deposited on said first leg of said substrate, first means connected said first surface wave device into a first oscillator circuit oscillating within a first predetermined frequency range,
   c. a second surface device deposited on said second leg of said substrate, second means connecting said second surface wave device into a second oscillator circuit oscillating within a second predetermined frequency range, said first leg of said substrate having no deliberate mechanical force applied thereto so that said first surface wave oscillator circuit produces a reference frequency,
   d. means inducing a deliberate strain in said second substrate to alter the frequency of oscillation of said second surface oscillator circuit, and
   e. means for comparing the frequency of oscillation of said first and second surface wave oscillation circuits to indicate the change in frequency of said second oscillator circuits resulting from the application of deliberate strain in its substrate.

4. The strain sensor claimed in claim 3 wherein said comparing means includes a mixer to indicate the difference in frequency between said two oscillators, means for establishing a time base, and counter means responsive to said established time base and said change in frequency to indicate in digital form the induced strain.

* * * * *